May 19, 1936.  C. ROTH  2,041,432
CRULLER MACHINE
Filed July 15, 1933  2 Sheets-Sheet 1
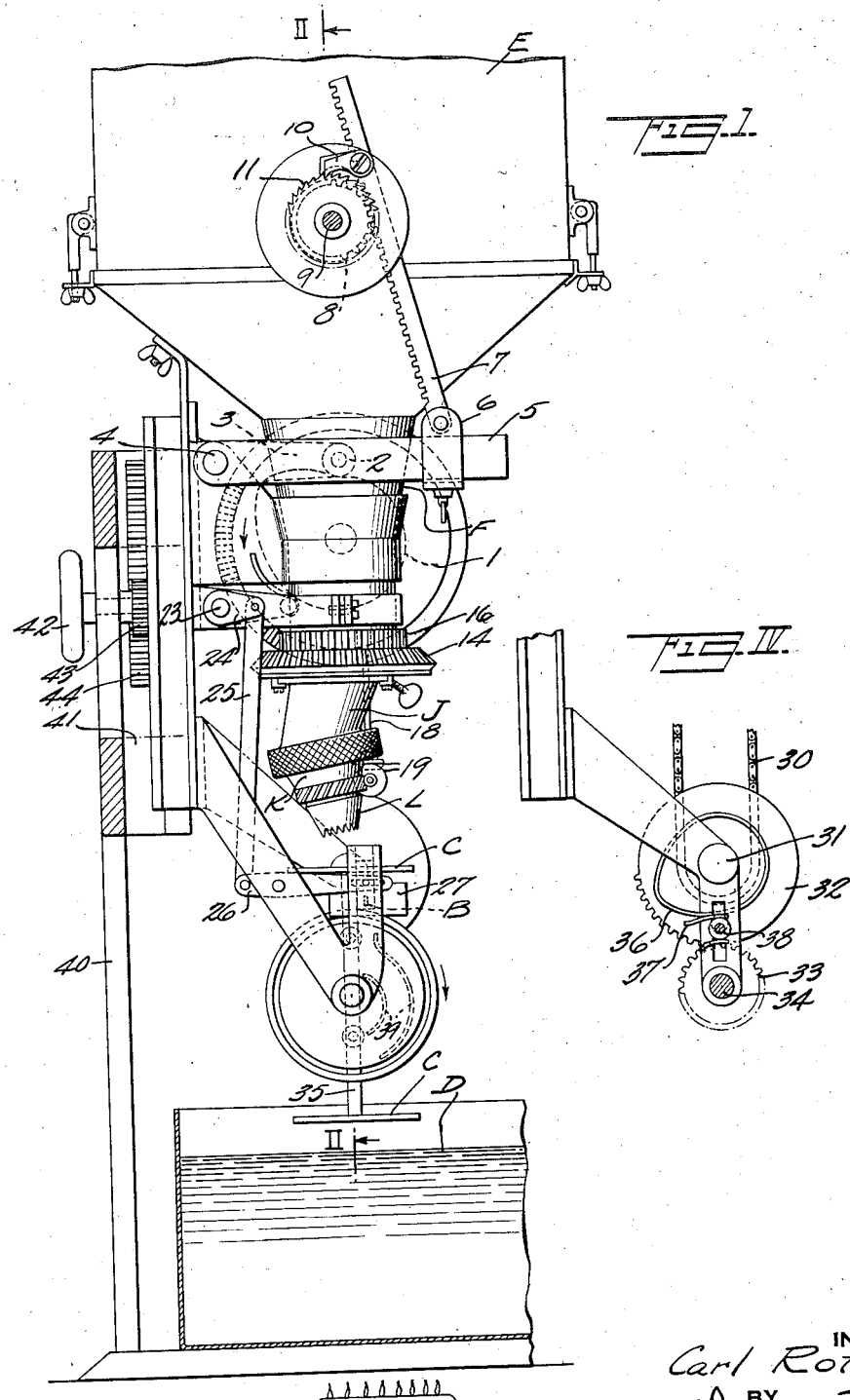
INVENTOR
Carl Roth
BY
his ATTORNEY May 19, 1936.                C. ROTH                2,041,432
                         CRULLER MACHINE
                      Filed July 15, 1933            2 Sheets-Sheet 2
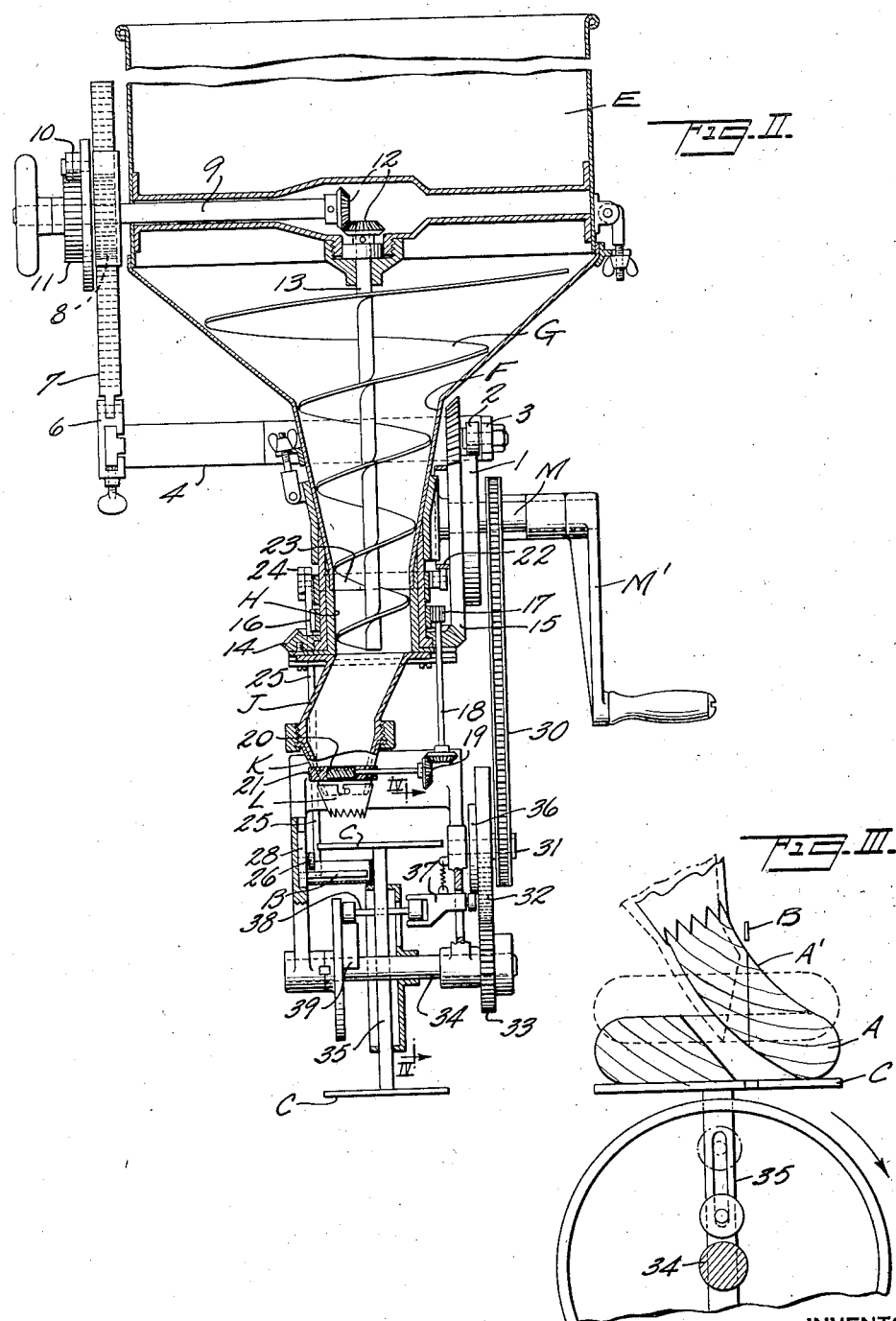
INVENTOR
Carl Roth
BY
his ATTORNEY Patented May 19, 1936

2,041,432

UNITED STATES PATENT OFFICE 2,041,432

CRULLER MACHINE

Carl Roth, Astoria, N. Y.

Application July 15, 1933, Serial No. 680,511

7 Claims. (Cl. 107—14)

This invention relates to machines for forming dough or the like into the desired configuration for the production of certain food products, such, for example, as crullers or doughnuts. Among the objects are to produce uniform product economically and to form the dough with regularity and precision, and other objects as may hereafter appear.

While the machine hereinafter shown and described may be designated particularly as a cruller machine, it is for the purpose of making the dough in the form for crullers ready for frying, or generally speaking cooking. Furthermore, the machine is subject to adjustment for the production of dough in forms for different sizes and different weights of product, so that the exact requirements of dough for production of a given quantity of final product can be determined, and thus and in other ways assure a variety of product with economy.

While the dough used for crullers may vary, and for what is known as the "French" cruller is a definite well known mixture, the machine also provides for the handling of the kind of dough used for doughnuts and for other purposes.

As this invention relates in particular to the machine, further reference to the character of dough is unnecessary, except that the machine is particularly adapted to meet all the characteristics of the dough involved in the production of this class of food products. The machine is automatic in all its essential actions, and may be operated by power drive, or, as desired, by hand power, either of which serves to set in operation and provide a continuous operation of the machine with the attendant advantages, as herein set forth and as may otherwise appear in the practice of my invention.

The particular embodiment of my invention hereinafter described consists in having a hopper for the predetermined dough so arranged that it will feed into a funnel and will be periodically driven through a cylinder into a discharge funnel and out of a discharge orifice where it is given the form desired. The intermittent feed provides for projecting the required quantity of dough for each individual piece, the orifice for the dough batch is adjacent a table and by movement of the orifice intermittently the stream of dough is laid—and also is turned so that it is deposited on the table in a circular form, is then cut loose from the orifice and funnel supply, and the two ends of the circularly-disposed batch then join, forming the endless ring of the well known cruller or doughnut. By the intermittent interconnected movements of the different parts of the machine, one dough ring is formed, deposited for immersion in the fat or grease, and the machine parts resume their position to receive a second batch or cruller ring, which is then automatically deposited as the first, and the continuous operation is such that in my machine complete and uniform formation of cruller rings, ready for cooking, can be completed at the rate of fifty or sixty and more per minute.

By the adjustment of the different coordinated parts I can vary the size of the ring section, or I can vary the diameter of the dough ring. By the variation of orifices where the dough exudes I can give the stream of dough a serrated surface assuring what might be coiling of the dough in the circular form, or producing serrated formations of the dough surface as it exudes, all for the purposes as will appear in the practice of my invention.

While my invention may be termed a cruller or doughnut machine, it provides for the forming and depositing of the dough in the essential manner required for the production of such bakery products. The additional steps of making the dough before it is introduced into the machine involve usual or special kneading and other apparatus and conveyors, that I may add for further efficiency, it also involves the transfer of the dough in proper form for crullers, etc., into the fat or grease, their transfer to the necessary frying or cooking means, which may be in the usual way, or for which I may add automatic apparatus to still further economize and systematize the final production of such articles of food.

Thus, the major item in the production steps is accomplished by my invention in measuring predetermined quantities and manipulating the same and depositing the same all in a most sanitary and efficient manner.

Furthermore, my machine or apparatus is preferably mounted in a manner with respect to the frying receptacle so that the successive pieces of formed dough are dropped into the pan or vat containing the fat or grease maintained at the proper temperature, and the depositing of the formed dough is regular and uniformly coordinated with the frying liquid. For example, the dough pieces are preferably dropped a uniform distance in order that they preserve their shape, but as the frying liquid is used up or evaporates my machine is capable of adjustment to maintain it always at a uniform level with respect to the frying liquid surface, and I may also support my machine so that it may be gradually moved progressively to drop the formed dough pieces over the surface of the frying liquid at different successive points, so that each piece drops freely into an unobstructed portion of the surface of the frying liquid, thereby assuring maintaining uniformity in the product which fries and becomes the complete merchantable article. For such purpose my machine may be mounted for vertical movement of adjustment, and lateral movement to spread out the depositing of the dough pieces.

While variations may be made in the construction and mounting of my machine, I describe herewith one specific embodiment which I have also illustrated in the accompanying drawings, in which:

Fig. I is a side elevation of the machine with parts of the mounting and frying vat in section.

Fig. II is a vertical section through the axis of the machine with some of the parts shown in elevation, on the line II—II of Fig. I.

Fig. III is a side elevation, fragmentary, but showing in full elevation the form of doughnut dough exuding from the machine at the moment of intermittent action when the discharge is stopped and the dough batch is severed by the knife for the automatic completion of the ring of the doughnut.

Fig. IV is a separate elevation of the mechanism for intermittent actuation of the receiving table for the formed dough batches.

The dough batch A is formed by the exuded stream of dough from the orifice, as shown in Fig. III. As the measured quantity of dough is forced out of the orifice, and the orifice circularly recedes, at a given point the knife B automatically moves quickly upward through the plate C, severs the dough with a beveled cut of the dough stream. The orifice attached to the "laying" funnel still moves slightly after the knife B has severed the stream, and the table C drops a short distance, so that the severed end A' drops clear of the material coming from the orifice and seals itself to the beveled end of the portion lying on the table C, thus forming a closed ring of dough. The dotted and dash positions, as shown, indicate the movement in the coordinated action of the machine, to the final position the dough ring is assuming on the receded table C. Helical serrations due to the teeth on the edge of the orifice assure the uniform circular serration, which is sometimes referred to as the formation in a French cruller. The table C then turns in the direction of the arrow, dropping the circularly formed cruller into the frying pan or vat.

The machine to produce these results comprises essentially a hopper E converging at its bottom into a funnel F, with a feed screw C engaging the dough in the bottom of the hopper and driving it intermittently downward in measured quantity through the cylinder H into a diverting funnel J, which is equipped with a removable constricting nozzle K and a removable changeable constricting orifice L, preferably having mechanism for rotating it.

The tables C and C' are mounted for intermittent lateral shifting, but with intermittent stationary positions adjacent the constricted orifice L, as shown.

A main driving shaft M may be driven by a crank M, as shown, or may have motor attachment to uniformly turn it. This shaft M is interconnected to intermittently actuate the dough feed screw G in exact coordination with intermittent turning of the funnel J, the intermittent turning of the orifice L, the intermittent movements of the tables C and C', and the intermittent action of the severing knife B,—so that regular intermittent actions in proper sequence and amount or degree follow successively in the various parts, with a uniform continuous turning of the main shaft M.

The interconnections and intermittent actions while subject to many variations, will be now understood from the brief description of the parts and the separate coupled cooperating elements.

Shaft M carries a cam 1 engaging a roller 2 on a lever 3 actuating a shaft 4, at the other end of which is an arm 5 with a block 6 which is adjustable on the arm to vary the amplitude of motion of the reciprocating of rack-bar 7 engaging the pinion 8 on the feed shaft 9. A pawl 10 with ratchet 11 holds the feed shaft 9 against reverse movement after the rack bar 7 has turned shaft 9 in the feed direction. The shaft 9 is encased in a tube in the lower part of the hopper and drives through bevel gears 12 the shaft 13, and thereby the feed screw G,—whenever the rackbar 7 is projected upwardly by the intermittent action due to cam 3.

At the bottom of the cylinder H the distributing funnel J is mounted with a gear 14 driven by an intermittent gear 15 on the shaft M,—so that the funnel J is turned while the feed screw G is driving the dough to the extent of a predetermined batch.

While the funnel J turns a gear 16 engaging a pinion 17 turns the shaft 18 with bevel gears 19, and through a shaft to the worm 20 on the worm gear 21 mounted on the constricted exit funnel K, thereby turning it and with it turning the orifice funnel L, so as to twist and serrate the surface of the constricted dough stream. Such twisting of the dough stream as it exudes, takes place as the distributing funnel J turns and the dough is forced by the screw 12, and then intermittently stops, when the predetermined stream of dough has been laid on the table C.

A suitable cam 22 oscillates the shaft 23 for the intermittent action of the severing knife B, accomplished by the intermittent movement of the lever 24 and the link 25 shifting the short end of the lever 26, which actuates the knife B with a quick trip action,—timed to sever with such knife or severing wire at the proper moment when funnels J—K and the orifice L have reached the point of intermittent rest. The knife is preferably immersed in a small vessel 27 containing water, between each severing movement so that it will not stick to the dough. The knife, as shown, is mounted in a slide block 28, which in turn is moved in a straight line by a pin-and-slot connection with the quick moving end of the lever 26.

The intermittent actions of the tables C and C' are accomplished by drive from the main shaft M through the chain 30, turning a shaft 31 with an intermittent gear 32, which drives gear 33 on shaft 34 with suitable housing to carry the shaft 35 supporting the tables C and C'. The shaft 31 also has the cam 36, which trips a roller and the box cam member 37 to shift shaft 38 connected with the table shaft 35, so as to drop the table at the right moment when the dough stream has been severed with the knife B. As the gear 33 then intermittently moves turning shaft 34, it brings the table C' to the upper position and stationary cam 39 acts on the pin or shaft 38 to raise the table C' to the proper level for the reception of the next batch of dough. While the intermittent action is proceeding, the snap action of the severing member or knife B causes it to pass through a slot in each table, and it may then turn to its initial position either through the slot, or after the table has partially turned it drops back between the turning tables into its position in the water bath 27.

The various parts are interconnected by suitable clamps, collars or threaded couplings, wing nuts, or otherwise, for the convenient assembly and disassembly, generally as shown. The adjustment of parts will be evident to one skilled in the art, but the coordination for the various intermittent actions involves the cam and intermittent gear and lever arrangements, all as herein described for the particular embodiment of my invention shown in the accompanying drawings.

The whole machine is shown mounted on the standard 40 in a sliding bracket 41 adjustable by the hand-knob 42, with pinion 43 on a rack 44, so that the machine may be raised and lowered in order that the tables deposit the finished dough pieces a uniform distance onto the surface of the frying liquid which will vary during the cooking of the dough and will gradually recede as successive batches of finished product are removed from the frying pan or frying vat, which would otherwise necessitate replenishing the fat or grease, involving changing the temperature and the attendant delay in bringing it to a frying temperature, which would thus interrupt and delay the operation of the machine.

Furthermore, the machine may be mounted for lateral movement, that is swinging so that it distributes the deposit of the dough rings across the surface of the frying liquid, at the same time regulating the elevation with respect to the surface of the frying liquid,—so that the formed product is uniformly distributed for the frying operation, the finished fried product can be picked out,—and the machine swinging back into its initial position and proceed to distribute, a continuous supply of the formed dough rings. In that manner the forming and the frying is a continuous operation, and thereby with maximum saving of time as well as energy in forming the dough for either crullers, doughnuts, or any desired product. Various orifices may be used and the control of the amount for each batch of material may be changed or may be regulated in accordance with the consistency of the dough used. When eggs, flour, oil and water constitute the dough, its consistency is different from when flour, fat and baking powder are used, as well as for any other mixtures of dough. The machine and its housing provide for meeting all the variations in the formation of many types of baked articles, but in particular my machine provides for the relatively intricate production of what is known as the French cruller.

It will thus be seen that the coordinated machine and frying equipment provide for continuous production with economy, speed and uniformity of product. The general arrangement and combination of parts causes a completely coordinated operation, as shown and described in the particular embodiment of my invention, while variations may be made in many respects without departing from my invention.

What I claim and desire to secure by Letters Patent is:

1. A machine for making crullers or the like, comprising means for positively feeding dough automatically and intermittently holding a predetermined quantity of dough, a table for receiving each predetermined quantity of dough, an outlet from the feeding means having a movable tube for circularly projecting successively each predetermined quantity of dough in a stream onto the table as a separate unit, a mouthpiece on the feed tube rotatable with respect thereto having an outlet edge formed to control the surface of the exuding dough stream.

2. A machine for forming dough in predetermined pieces or batches preliminary to frying or baking, comprising means for forcing a stream of dough in a measured quantity and laying it to a finished form, intermittent means for positively feeding and intermittently holding the supply of dough, and an outlet including a movable tube to direct the dough in a predetermined path with a final outlet mouthpiece for said tube movable with respect thereto.

3. A dough-forming machine, a funnel, a positive and an intermittent feed in said funnel to its exit, a rotatable sleeve forming an orifice directly connected to the exit of the funnel adapted to exude dough in a circular path, a movable mouthpiece at the exit coordinated in its motion with the feed of the dough, a table to receive a stream of formed dough from the orifice, coordinated driving means holding the table stationary while the feed and the orifice sleeve are moving across the table and to stop the feed and orifice sleeve while the table is moving.

4. A dough-forming machine of the character described, having a positive feed for intermittently projecting a predetermined quantity of dough and then stopping the movement of the dough, an outlet for the dough consisting of a tube registering with the feeding means and having means to move said tube while the dough is passing through it, a mouth-piece on said tube and means to move the same relative to the tube, and means on said mouth-piece adapted to serrate the exuding stream of dough, for the purpose described.

5. A dough-forming machine having means for positively feeding and intermittently holding the dough, an outlet therefrom having a movable tube to direct the dough in a circular path, a mouth-piece for said tube rotatable with respect to the tube and having an outlet edge formed whereby the surface of the exuding dough stream is spirally creased.

6. A dough-forming machine having means for positive feeding and intermittently stopping the feed of dough to a forming outlet, an outlet having a tube movable in coordination with the dough-feed stopping adapted to exude the dough in a circular stream, a table to receive the dough and a mouthpiece for the outlet having means to move the outlet transversely across the top of the table to lay the stream of dough in a predetermined formation, means for cutting the stream of dough intermittently with the stopping of the feeding of the dough, and means for thereafter displacing the table laterally and downward to thereafter eject the formed dough from the table onto the surface of the frying bath.

7. A machine forming articles from dough including a funnel, means for positively feeding and intermittently holding the dough, a rotating tube forming an orifice for the projection of measured quantities of dough operating in coordination with the feeding and holding means and adapted to exude the dough in a stream as a finished unit, a table adjacent the exit of the dough stream adapted to receive the unit dough formed laid gently thereon while the table is stationary, means for controlling intermittent motion of the tube coordinated with intermittent shifting of said table.

CARL ROTH.